(12) United States Patent
Schambeck

(10) Patent No.: US 9,815,129 B2
(45) Date of Patent: Nov. 14, 2017

(54) SAW BENCH

(71) Applicant: Josef-Michael Schambeck, Parkstetten (DE)

(72) Inventor: Josef-Michael Schambeck, Parkstetten (DE)

(*) Notice: Subject to any disclaimer, the term of this patent is extended or adjusted under 35 U.S.C. 154(b) by 166 days.

(21) Appl. No.: 14/308,128

(22) Filed: Jun. 18, 2014

(65) Prior Publication Data

US 2014/0360332 A1 Dec. 11, 2014

Related U.S. Application Data

(63) Continuation of application No. PCT/EP2012/076516, filed on Dec. 20, 2012.

(30) Foreign Application Priority Data

Dec. 21, 2011 (DE) .................... 10 2011 122 524

(51) Int. Cl.
  *B23D 47/02* (2006.01)
  *B27B 21/00* (2006.01)
  *B27B 17/00* (2006.01)

(52) U.S. Cl.
  CPC ........ *B23D 47/025* (2013.01); *B27B 17/0058* (2013.01); *B27B 21/00* (2013.01); *Y10T 83/7684* (2015.04)

(58) Field of Classification Search
  CPC . B27B 17/058; B27B 17/0041; B27B 17/005; B27B 17/0066; B27B 17/0083; B23D 47/025; B23D 47/02; Y10T 83/7684; Y10T 83/707; Y10T 83/8763

USPC ................... 144/286.5, 286.1, 287
  See application file for complete search history.

(56) References Cited

U.S. PATENT DOCUMENTS

| 4,121,814 | A |   | 10/1978 | Prior |
| 4,215,612 | A | * | 8/1980  | Peel .................... B27B 17/0058 83/490 |
| 4,307,640 | A |   | 12/1981 | Michael |
| 4,350,067 | A | * | 9/1982  | Picard ................ B27B 17/0058 269/296 |
| 4,553,463 | A |   | 11/1985 | Engel |
| 4,606,252 | A | * | 8/1986  | Lahti ................... B27B 17/0058 83/574 |
| 5,862,731 | A | * | 1/1999  | Chen ........................ B25H 1/10 144/253.1 |
| 6,311,598 | B1* | | 11/2001 | Osborne ............. B27B 17/0083 125/21 |

(Continued)

FOREIGN PATENT DOCUMENTS

| CN | 2233808 | 8/1996 |
| CN | 2437465 | 7/2001 |

(Continued)

*Primary Examiner* — Phong Nguyen
(74) *Attorney, Agent, or Firm* — Simpson & Simpson, PLLC

(57) ABSTRACT

A saw bench having a first pair of legs and a second pair of legs. Between the first pair of legs and the second pair of legs are two cross members for material to be cut. A sawing kerf is formed between cross members. A first guide rail and/or a second guide rail for a sawing member is mounted on the saw bench in such a way that, during sawing of the material to be cut, the sawing member engages through the sawing kerf below a level of the material to be cut, which is held by the two cross members.

18 Claims, 20 Drawing Sheets

(56) References Cited

U.S. PATENT DOCUMENTS

| | | | | |
|---|---|---|---|---|
| 7,644,846 B2 * | 1/2010 | Hafendorfer | ............. | B60P 3/14 |
| | | | | 211/60.1 |
| 2012/0205009 A1 * | 8/2012 | Barnhill | ................... | B25H 1/04 |
| | | | | 144/286.5 |

FOREIGN PATENT DOCUMENTS

| | | |
|---|---|---|
| CN | 2455451 | 10/2001 |
| CN | 200995305 | 12/2007 |
| DE | 2735777 A1 | 2/1979 |
| DE | 3134854 A1 | 3/1983 |
| DE | 8715727 U1 | 2/1988 |
| DE | 29603645 U1 | 8/1996 |
| DE | 29914395 U1 | 1/2000 |
| DE | 29921782 U1 | 2/2000 |
| DE | 10006761 A1 | 8/2000 |
| DE | 20107973 U1 | 8/2001 |
| DE | 20213483 U1 | 12/2002 |
| DE | 10224277 A1 | 4/2003 |
| DE | 202004005124 U1 | 7/2004 |
| DE | 102007001271 A1 | 7/2008 |
| DE | 202009014060 U1 | 2/2010 |
| FR | 2527501 | 12/1983 |
| FR | 2701663 | 8/1994 |
| FR | 2712525 | 5/1995 |
| GB | 2316355 A | 2/1998 |
| JP | S55140402 U | 10/1980 |
| JP | S63178101 | 11/1988 |
| JP | 2000141304 | 5/2000 |
| JP | 2003094401 | 4/2003 |

* cited by examiner

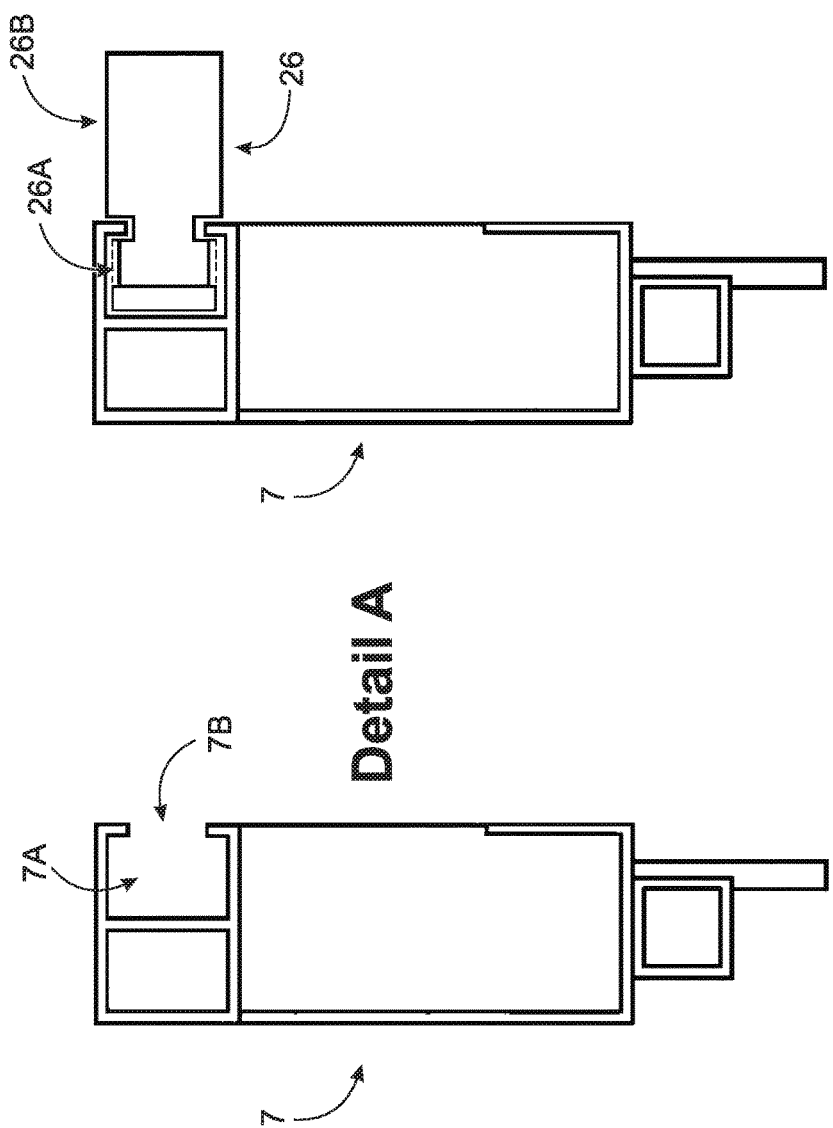

SAW BENCH

CROSS-REFERENCE TO RELATED APPLICATIONS

This application is filed under 35 U.S.C. §120 and §365(c) as a continuation of International Patent Application PCT/EP2012/076516, filed Dec. 20, 2012, which application claims priority from German Patent Application No. 10 2011 122 524.6, filed Dec. 21, 2011, which applications are incorporated herein by reference in their entireties.

FIELD

The invention relates to a saw bench. In particular, the saw bench has a first pair of legs and a second pair of legs, wherein at least two cross members are provided between the first pair of legs, and at least two cross members are provided between the second pair of legs for receiving goods to be cut.

BACKGROUND

The German patent application DE 27 35 777 discloses a saw bench for wood with slidable additional pieces for cutting short wood parts. The additional pieces can be moved together or separately along to the left or to the right, so as to provide support for the wood to be cut. A guide for a saw is not provided.

The German patent DE 31 34 854 C2 discloses a collapsible sawhorse comprising two pairs of stands capable of being spread in the form of scissors and a supporting leg, linked such that it may be folded obliquely. At least one cross-connection sets a distance between the two pairs of stands capable of being spread in the form of scissors. Between the ends of the scissor-like legs, the wood or the work piece is received.

The German patent DE 100 06 761 C2 discloses a saw horse, which is designed such that the handling with a chainsaw is easier, and allows a professional to safely cut given lengths of timber wood. The sawhorse has two stable standing crosses and interposed holding or standing crosses. The stand and holding crosses are connected by parallel-running cross braces in a form-fitting manner. The top beams of the standing and holding crosses have at least one side of a different length. The longer and shorter beams are each arranged alternately.

The German patent DE 201 07 973 U1 discloses a saw bench with a support for a piece of wood to be cut. Support members are provided for securing the piece of wood. The support is divided into several sections and slightly raised upwards. Each distance between the adjacent sub-areas has a depression deep enough to fully cut through the wood. When sawing through the wood, the wood is allowed to fall through the slanted support.

The German patent DE 202 13 483 U1 discloses a saw bench made of metal, having a gas spring tensioning device for safe sawing of logs up to 4 m in length. There are four interconnected scissor bucks for receiving the logs. A penultimate bracket mounted gas spring serves as a clamping device. For this purpose, a movable arm is provided. The wood is firmly clamped by pulling down a lever. The scissor bucks are collapsible by connecting pins.

The German patent DE 296 03 645 U1 discloses a saw horse with at least two mutually spaced, interconnected saw horse elements. Each element comprises a clamping device for compressing a wood pile. The saw horse may pile and clamp wood piles from about 5 to 20 cm thick, which may subsequently be cut with a saw from top to bottom five to six times without adjusting the clamping force of the wood. In this way, unaided, a person alone can chop firewood from branches, twigs or stems without being exposed to a significant risk of injury.

The German patent DE 20 2004 005 124 U1 discloses a saw horse used for individually sawing wood slices of a tree trunk or similar hardwood. The saw horse has a plurality of bearings. Between the individual bearings an intermediate space is provided. At the bearing heads, guide plates are attached at the left and right side of the tree trunk. The bearing head guide plates are oriented approximately at a 45° angle and facing away from the tree trunk to ensure a flexible fixation of different thicknesses of the tree trunk.

SUMMARY

The object of the present invention is to provide a saw bench for sawing a large variety of materials wherein the sawing process is safe.

The above object is achieved by a saw bench comprising a first pair of legs; a second pair of legs; at least two cross members for material to be cut are arranged between the first pair of legs and the second pair of legs; a first abutting element and a second abutting element are provided with each cross member and being arranged at an angle with respect to each other; a kerf defined between the cross members; and at least a first guide rail and/or at least a second guide rail for a sawing member mounted on the saw bench in such a way that, during sawing of the material to be cut, the sawing member reaches through the kerf below a level of the material to be cut.

According to the invention, each cross member comprises a first abutting element and a second abutting element arranged at an angle with respect to each other. A kerf is defined between the cross members. In order to ease the sawing process, at least a first guide rail and/or at least a second guide rail for a sawing means is mounted on the saw bench in such a way that, during sawing of the material to be cut, the sawing means reaches through the kerf below a level of the material to be cut.

The first guide rail is mounted to the frame at the backside. A guide pin is attached to the sawing member, so that the sawing member is slidably guided in the first guide rail. The first guide rail comprises a holding fork at which the sawing means can be parked after the sawing process. The second guide rail is mounted to the frame at the backside of a second abutting element. A guide pin is attached to the sawing member, sot that the sawing member is slidably guided in the second guide rail. A holding fork is mounted to the second guide rail, on which the sawing member is parked.

Furthermore, a rocking device can be mounted to the frame in a receptacle at a free end of the second abutting element. A guide pin is connected to the sawing member and is slidably guided in a guide channel of the rocking device. On the rocking device, a holding fork is provided at which the sawing member is parked.

The free end of the first abutment and/or the free end of the second abutting element comprise at least one take-up wherein the holding elements may hold timber to be cut. Each holding element comprises at least one pin, which engages in a form-fitting manner in order to mount the holding element in the receptacle.

The legs of the first pair of legs and the legs of the second pair of legs are each rigidly connected together such that the legs of each pair of legs are arranged at an acute angle. The two pairs of legs and the cross members for the pieces to be cut are rigidly fastened to a frame of the saw bench. The frame of the saw bench may be associated with four rigid base supports, which are not adjusted in height. The base supports have slides mounted at opposite ends, so that the saw bench can be moved easily. According to a further embodiment of the invention, the four floor supports are height adjustable. This allows the equalizing on uneven ground.

At least one extension module is detachably connected to the frame of the saw bench. Depending on the type of the extension module, two rigid non-adjustable floor supports or two height adjustable floor supports are mounted.

A wheel can be attached to the saw bench. The wheel is adjustable in height by means of a mechanical crank. Similarly, two driving handles can be inserted into corresponding slots on the frame of both directions. The driving handles are parked in appropriate positions on the frame and do not disturb the working process when the saw bench is in use.

The first abutting element and the second abutting element have several securing elements for the material to be cut, so that any slipping of the material to be cut is avoided.

The basic idea of the inventive multi-functional saw bench is the expansion to several versions which have different working lengths. The "beginner" model measures 800 mm, the "standard" model measures 1,000 mm and the "professional" model has a working length of 1,300 mm. The cross members have different widths and are separated by kerfs (width about 10 cm). The user can saw the material with a motor chain saw or electrical saw vertically from above. The cut is directed to one of the kerfs. These kerfs are arranged so that the users saw the material to be cut completely through and the sawing member passes, due to the kerfs, substantially below the level of the on-the-cross members.

Thus, the wood or the material to be cut does not fall off the saw bench before or after the sawing process. On both sides, the support is formed by the cross members, and holding elements are provided, which are also made of a tube with rectangular form. These support elements are mounted to the framework of the saw bench. The support elements can also be arranged arbitrarily and can also be parked below the support surface in designated elements. The support elements are always available on the saw bench, and can be secured by bolts. The support elements are suitable not only for bundles of firewood, but also for the branches, round timber, or boards. Twist locks prevent of the rotation of round wood at the time of sawing. Additionally, the cut wood remains on the saw bench as a package and can be removed from the saw bench as a whole.

The saw is used together with at least one guide rail on the frame of the saw bench. Thus, a tilting of the sawing member or a sawing into the cross members can be prevented. The guide rails are slightly inclined inwards, which facilitates the sawing process and supports the natural sawing motion. A guide pin provides the necessary guidance of a chain saw within the guiderail.

Another advantage is that the guide rails mark the respective cut at the position of the saw kerfs. The mounted or mountable guide rails, however, highlight the correct cutting position. For a better distinction, all pluggable, i.e. removable parts on the saw bench are painted in the signal color orange. In addition, after each sawing, the saw can be suspended in a holder, which is connected downstream of the guide rail. The saw is then in a cleared position.

So that the saw bench can be easily moved, a chassis is provided, which consists of a wheel, which is adjustable in height by means of a mechanical crank. The height of the wheel may be up to 25 cm. The wheel can be attached at both sides of the saw bench. Also, two handles can be attached in either driving direction and can be parked on the frame of the saw bench.

The length of the saw bench can be extended with extension modules. It is also possible that the saw bench is provided with four height-adjustable floor supports to compensate for uneven terrain. Sawing may also be completed with hand tools, so pure muscle power is also possible. The hacksaw can be guided by one of the guide rails during the cutting process.

According to a further embodiment, the saw bench comprises a first pair of legs and a second pair of legs. At least two cross members for material to be cut are arranged between the first pair of legs and the second pair of legs. A first abutting element and a second abutting element are provided with each cross member and being arranged at an angle with respect to each other. A kerf is defined between the cross members. A rocking device for a sawing member is mounted to the second abutting element of the saw bench. The rocking device and a securing pin ensure a safe cutting process for motor, hydraulically or pneumatically driven sawing members. The securing pin is provided with the sawing member and is slidably guided in a guide channel of the rocking device. A holding fork is mounted to the rocking device in order to park the sawing member after the sawing process.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 42A is a detail view of the guide rail shown in FIG. 2; and,

FIG. 42B is a detail view of the guide rail shown in FIG. 42A with the guide pin engaged therein.

DETAILED DESCRIPTION OF THE INVENTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials, and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices, or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
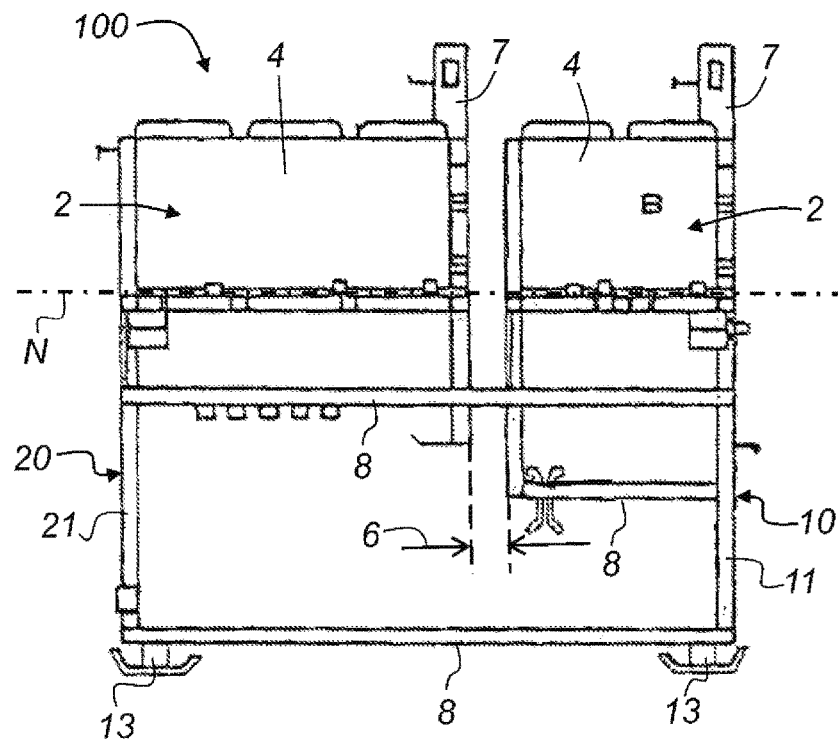
FIG. 1 shows a side view of an embodiment of the saw bench.

Referring now to the figures, FIG. 1 is a side view of an embodiment of the inventive saw bench 100. Saw bench 100 has first pair of legs 10 and second pair of legs 20. First pair of legs 10 and second pair of legs 20 are rigidly connected to frame 8. Between first pair of legs 10 and second pair of legs 20, at least two cross members 2 are arranged, on which material to be cut 3 (shown in FIG. 18) is positioned. Cross members 2 are separated by kerf 6. Kerf 6 allows sawing member 40 (shown in FIG. 18) to reach through kerf 6 and below level N of material to be cut 3, which is positioned on and/or at the at least two cross members 2.

Figure 2:
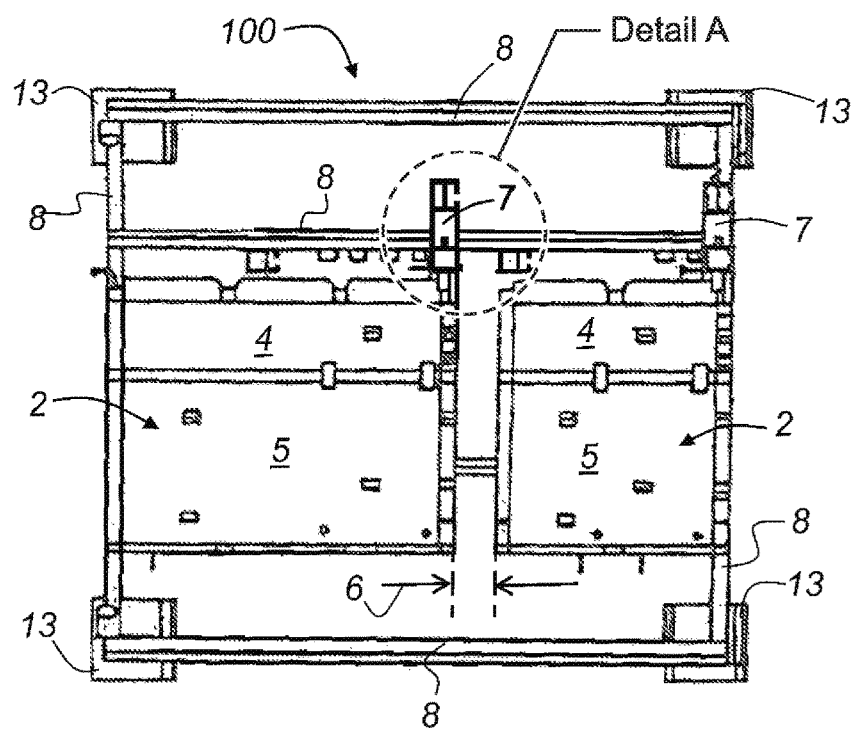
FIG. 2 is a plan view of the embodiment of the saw bench.

FIG. 2 is a plan view of the embodiment illustrated in FIG. 1 of saw bench 100. Each cross member 2 has first abutting element 4 and a second abutting element 5. First abutting element 4 and second abutting element 5, as can be seen from FIG. 3, are arranged at an angle α with respect to each other.

Figure 3:
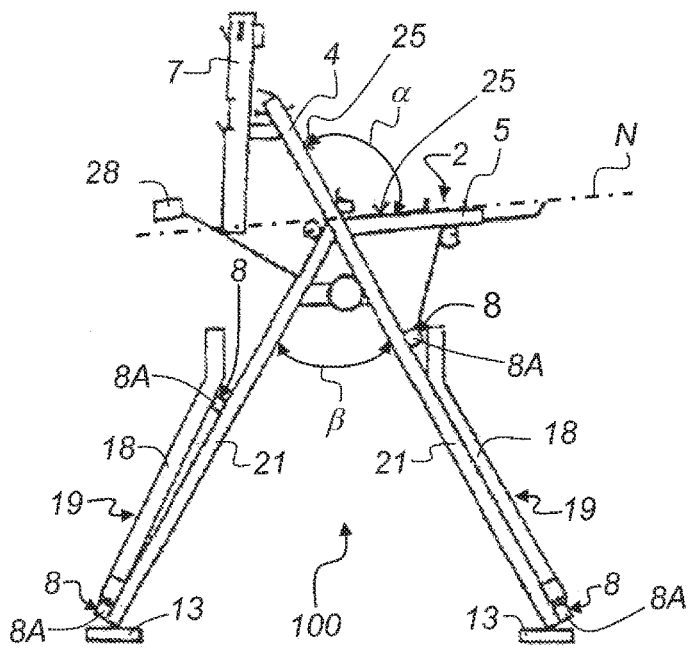
FIG. 3 is a side view of the saw bench.

In FIGS. 1-3, first guide rail 7 for sawing member 40 (shown in FIG. 18) is mounted on saw bench 100 such that sawing member 40 extends through kerf 6 when material to be cut 3 is cut. Sawing member 40 thus reaches below level N of material 3 to be cut. First guide rail 7 is attached and secured to frame 8 from the back of the respective first abutting element 4. First guide rail 7 has mounted holding fork 28 on which sawing member 40 can be parked. According to the view shown in FIG. 3, second pair of legs 20 can be seen. Legs 21 of second pair of legs 20 are arranged at an acute angle β. Two driving handles 18 are inserted into an appropriate parking position 19 on the frame 8. In the embodiment shown here, frame 8 of saw bench 100 has four rigid floor supports 13. Floor supports 13 cannot be adjusted in height. The floor-engaging ends of floor supports 13 have the form of a skid plate, so that saw bench 100 may be moved easily over the floor or ground. On the side of first abutting element 4 and/or on the side of second abutting element 5, at which material to be cut 3 comes to lie, securing elements 25 are attached. Securing elements 25 prevent slippage of material to be cut 3 during the sawing process.

Figure 4:
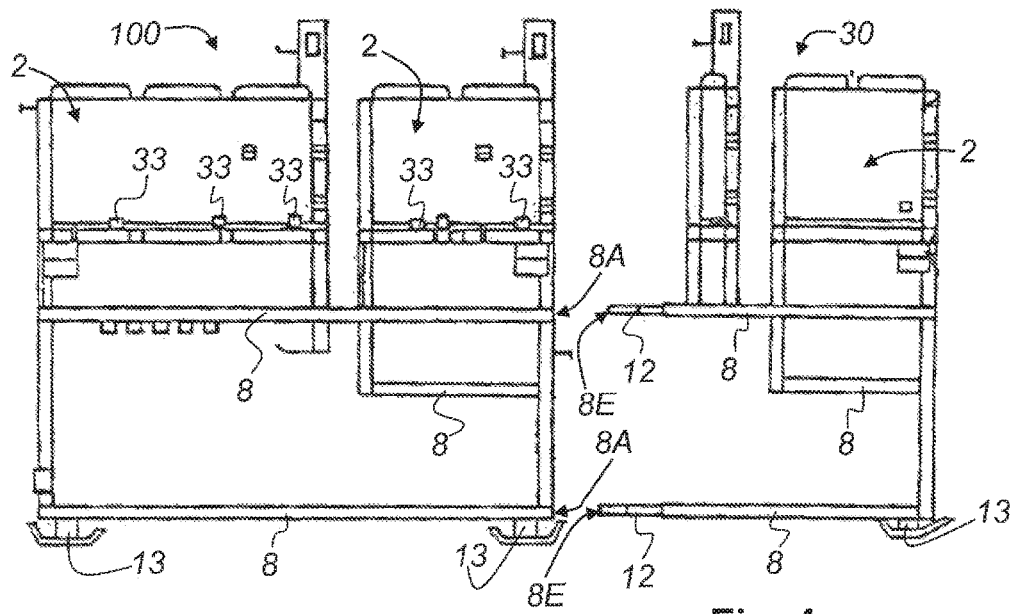
FIG. 4 is a side view of a further embodiment with an extension module for the saw bench shown in FIG. 1.

FIG. 4 shows a side view of saw bench 100, to which extension module 30 is associated. Extension module 30 includes frame 8, which forms on each of its free ends 8E a connector 12, which engage with corresponding take-up devices 8A (see for example FIG. 3) of frame 8 in a form-fitting manner. Extension module 30 may be secured, for example, with a conventional safety pin to saw bench 100. On extension module 30 a cross member 2 is mounted. Similarly, first guide rail 7 is provided which is associated with kerf 6. Each of extension modules 30 have two floor supports 13, which are formed in the embodiment shown here, as rigid floor support 13. Cross member 2 has take-up devices 33 which mount holding elements 42 (shown in FIGS. 40 and 41).

Figure 5:
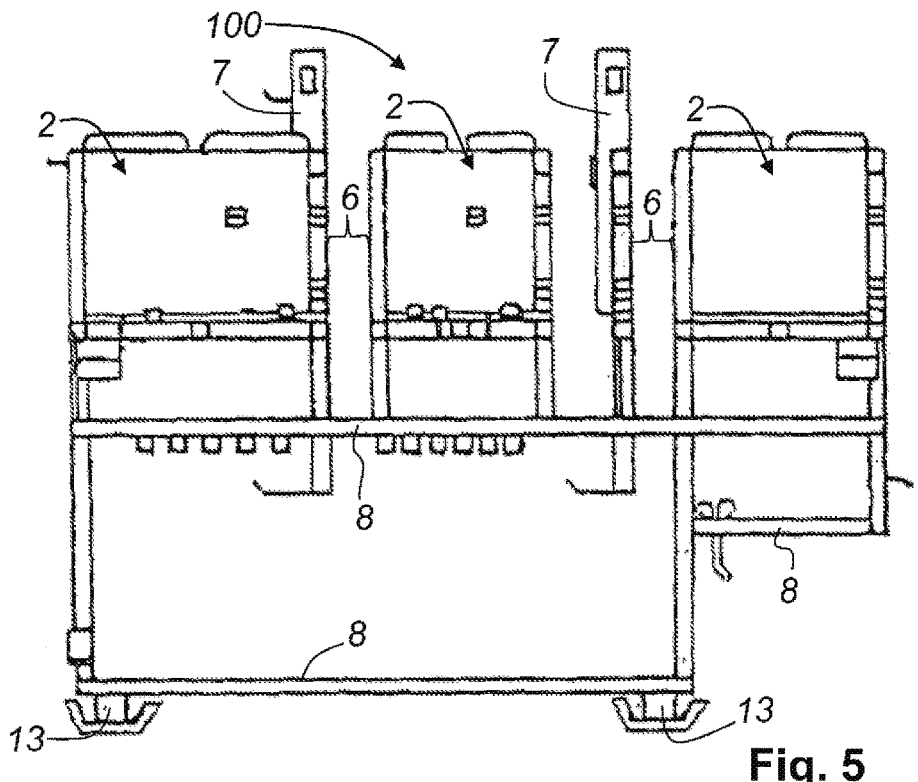
FIG. 5 is a side view of another embodiment of the saw bench.
Figure 6:
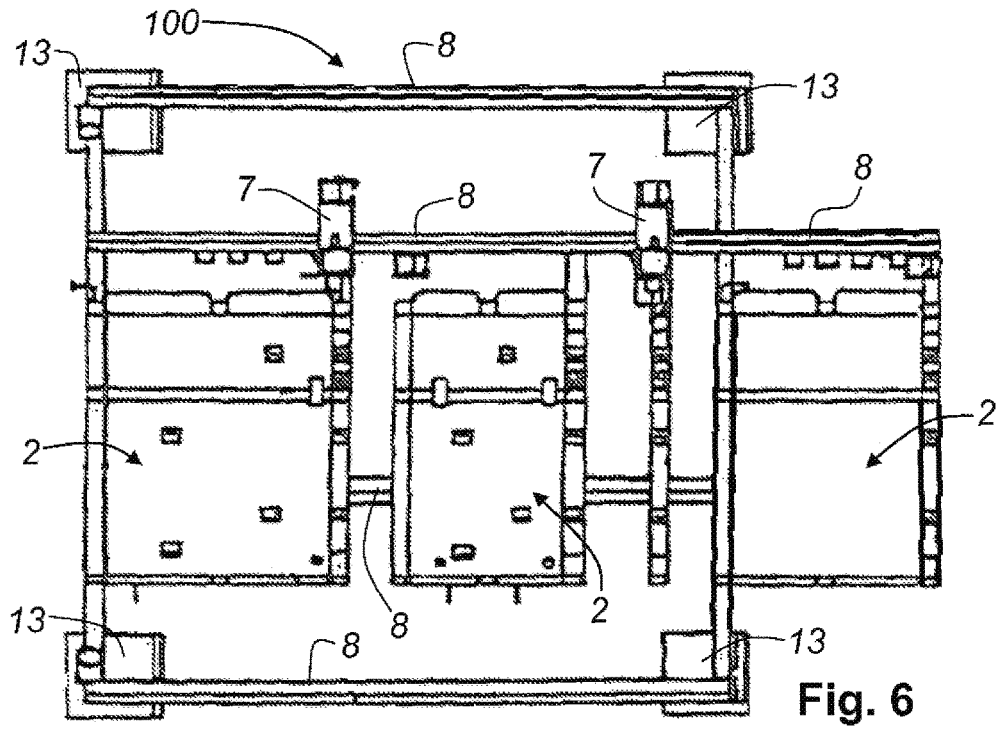
FIG. 6 is a plan view of the embodiment shown in FIG. 5 of the saw bench.

FIG. 5 is a side view of another embodiment of saw bench 100. Saw bench 100 has three cross members 2, which are permanently fixed to frame 8 of saw bench 100. Kerfs 6 are formed between cross members 2. Each of kerfs 6 are associated with first guide rail 7. FIG. 6 is a plan view of the embodiment of saw bench 100 shown in FIG. 5. It can be seen that this embodiment has four floor supports 13, and rigid frame 8 carries cross members 2 and first guide rails 7.

Figure 7:
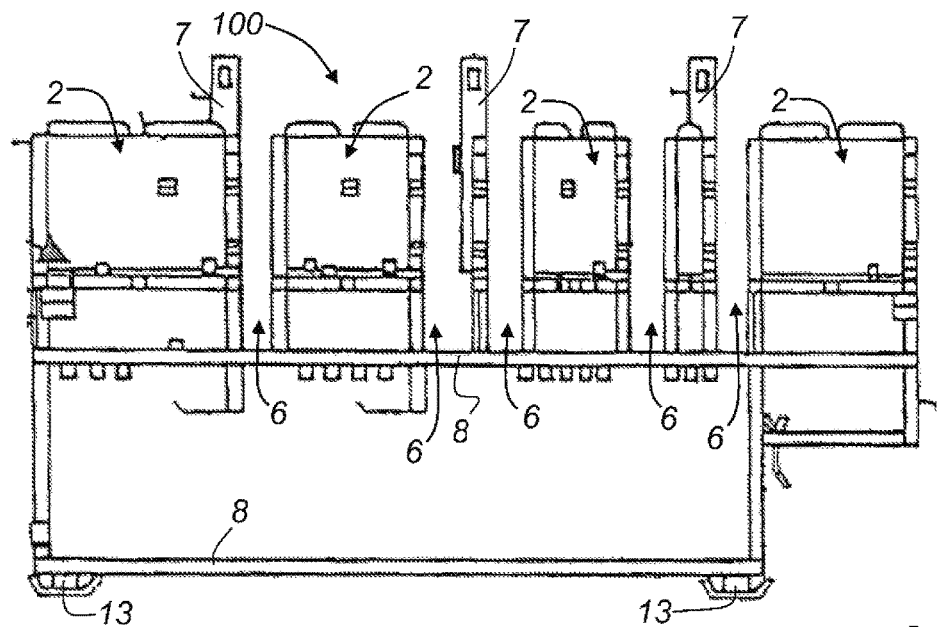
FIG. 7 is a side view of an additional embodiment of the saw bench.
Figure 8:
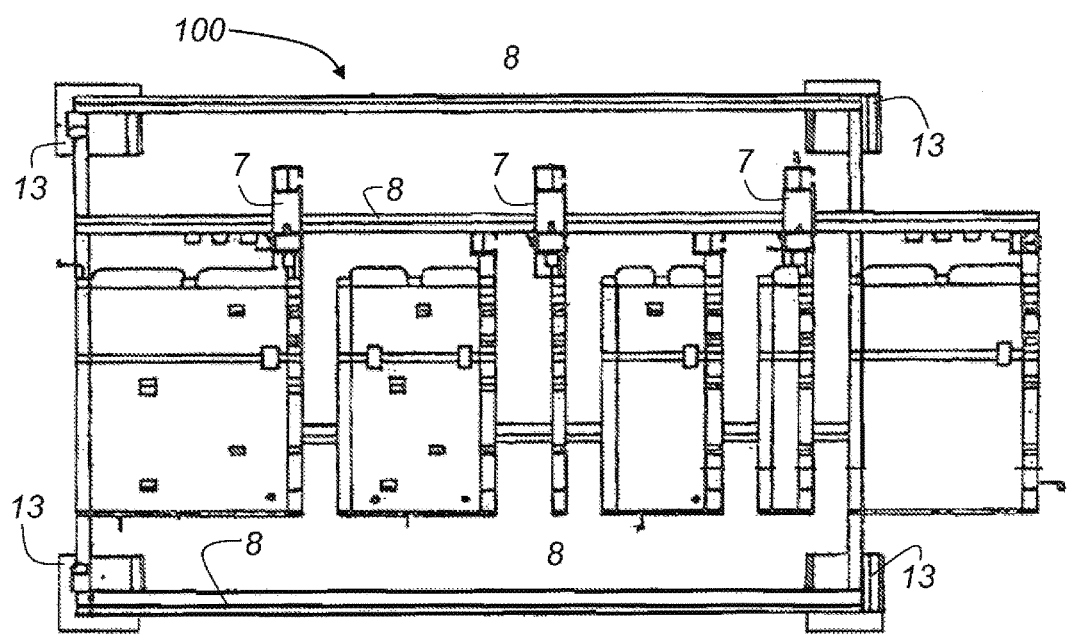
FIG. 8 is a plan view of the embodiment shown in FIG. 7 of the saw bench.

FIG. 7 and FIG. 8 show another embodiment of saw bench 100. Saw bench 100 has four cross members 2 which are fixed to frame 8 of saw bench 100. Between cross members 2, kerfs 6 are formed. First guide rail 7 is associated with each of kerfs 6. FIG. 8 is a plan view of a further embodiment of saw bench 100 according to the invention which has four bottom supports 13. Rigid frame 8 carries four cross members 2 and three first guide rails 7.

Figure 9:
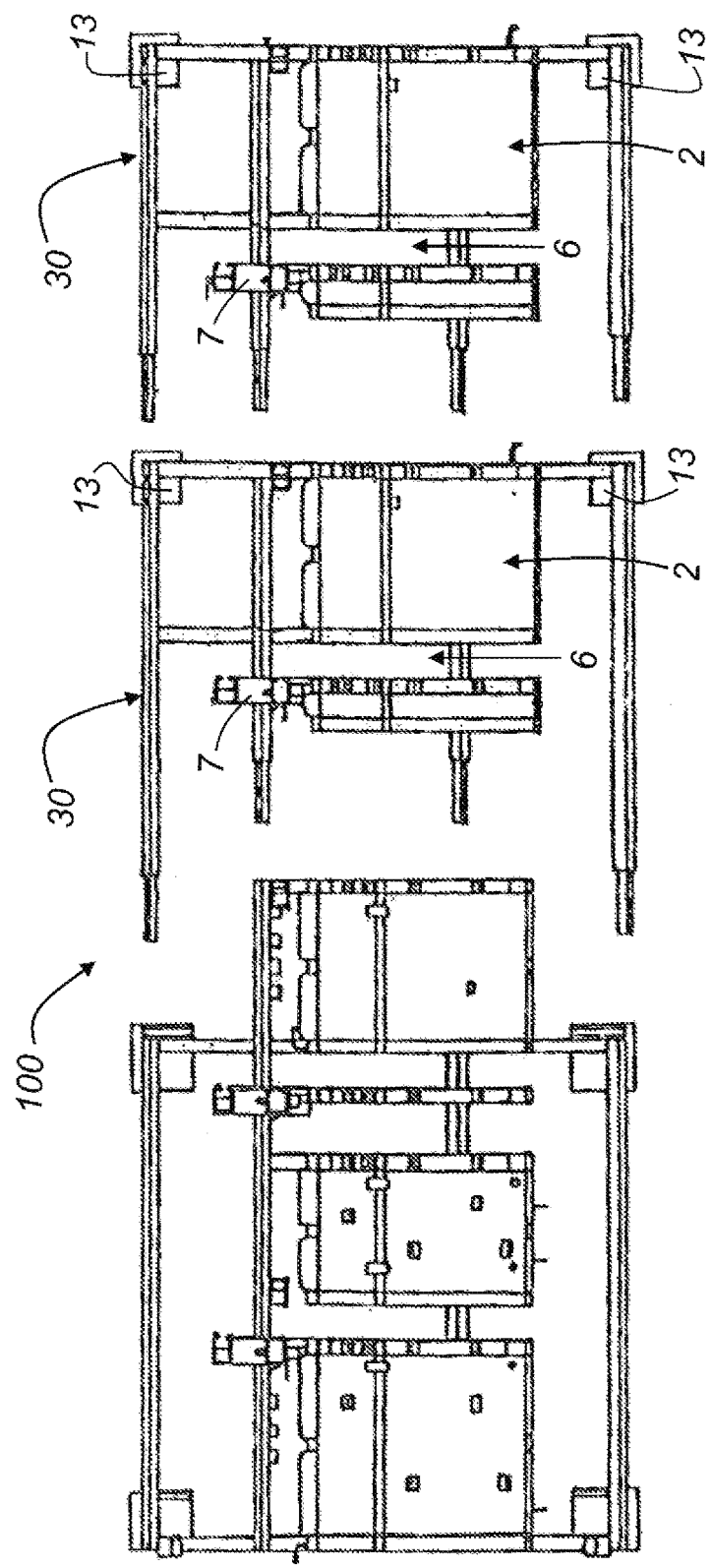
FIG. 9 is a plan view of the embodiment shown in FIG. 5 of the saw bench, wherein the extension modules are shown for the extension of the saw bench.

FIG. 9 is a plan view of saw bench 100 of the embodiment shown in FIG. 5, wherein a plurality of extension modules 30 can be releasably connected to saw bench 100 in order to extend saw bench 100 in length. Cross member 2 is mounted on each extension module 30. Similarly, first guide rail 7 is provided, which is assigned to kerfs 6 of each extension module 30. Each extension module 30 has two floor supports 13 which are, according to present embodiment, formed as rigid floor supports 13.

Figure 10:
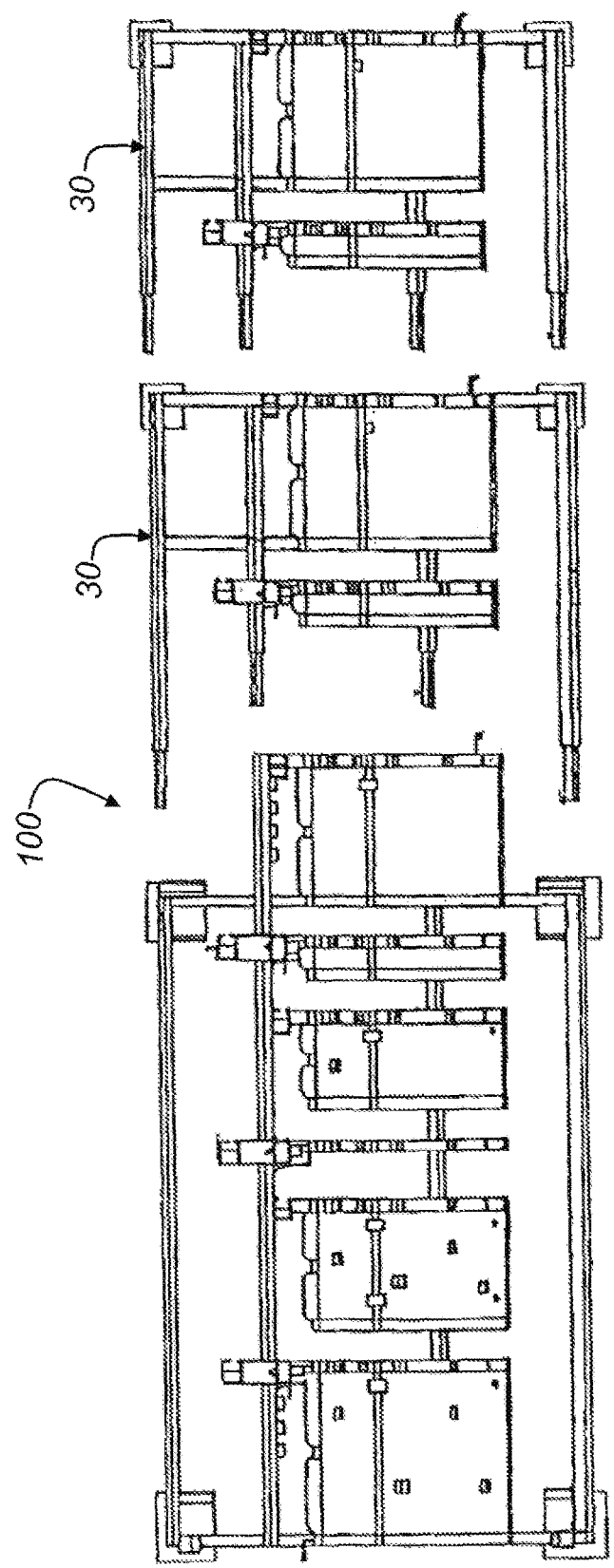
FIG. 10 is a plan view of the embodiment shown in FIG. 7 of the saw bench, wherein the extension modules are shown.
Figure 11:
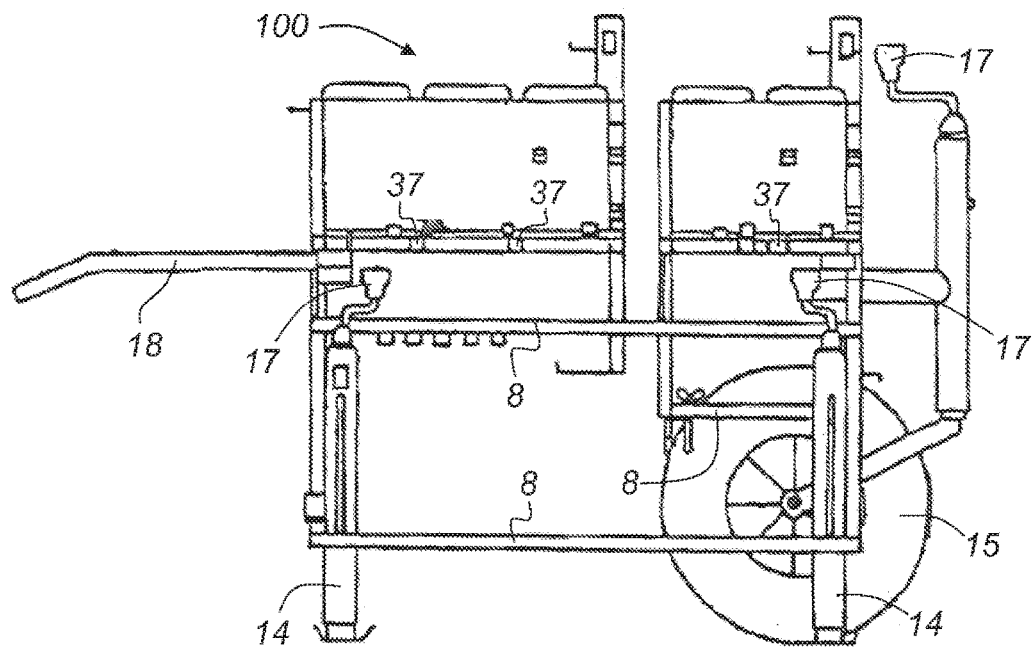
FIG. 11 shows a side view of an embodiment of the saw bench, which is provided with a wheel and driving-handles.
Figure 12:
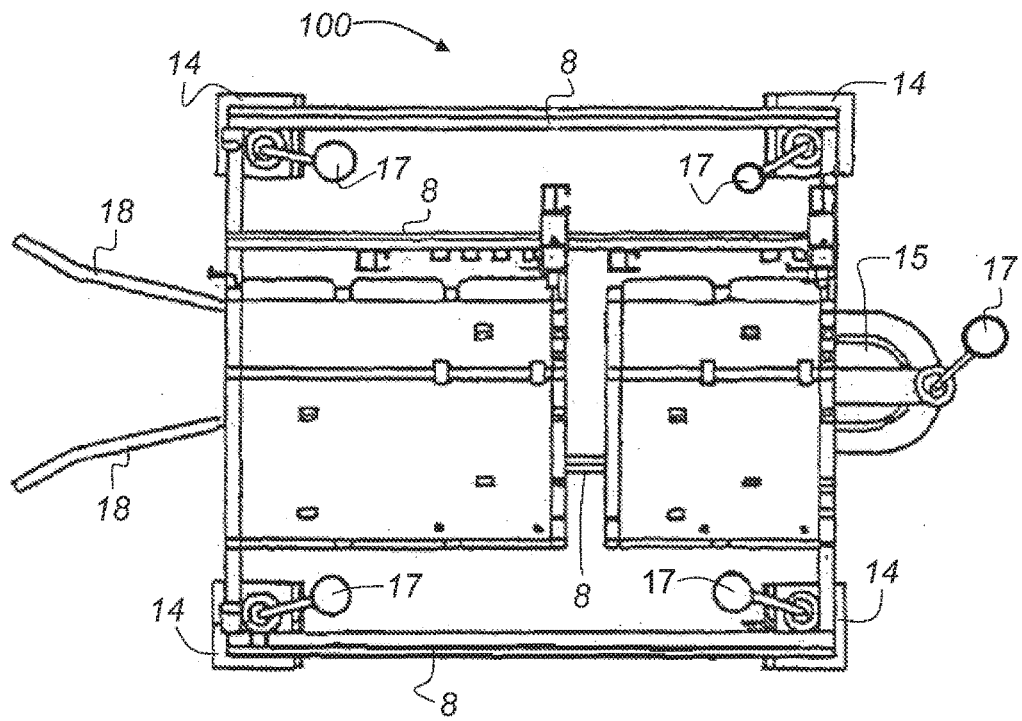
FIG. 12 is a plan view of the embodiment shown in FIG. 11 of the saw bench.
Figure 13:
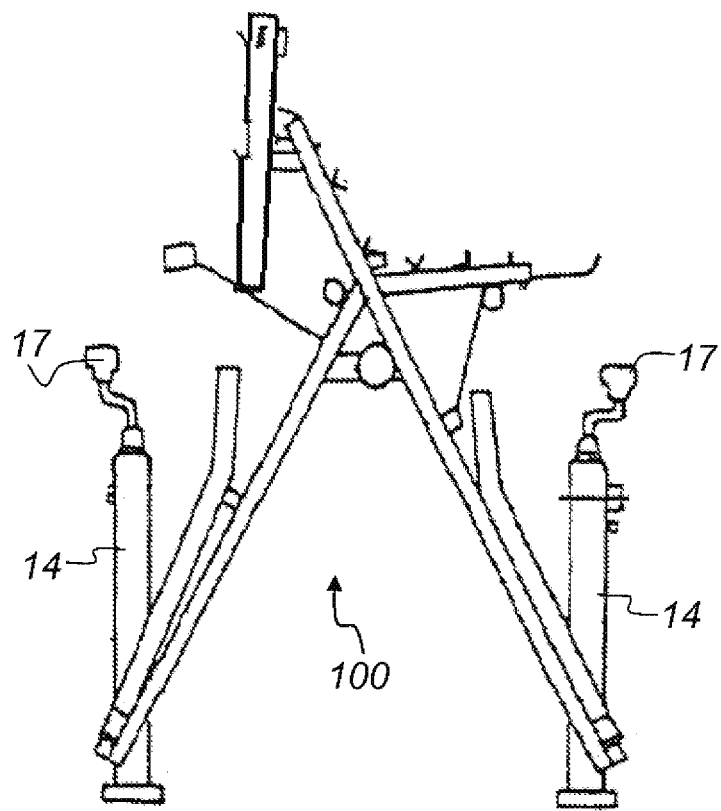
FIG. 13 is a front view of the side of the saw bench, on which the driving handles are to be attached.
Figure 14:
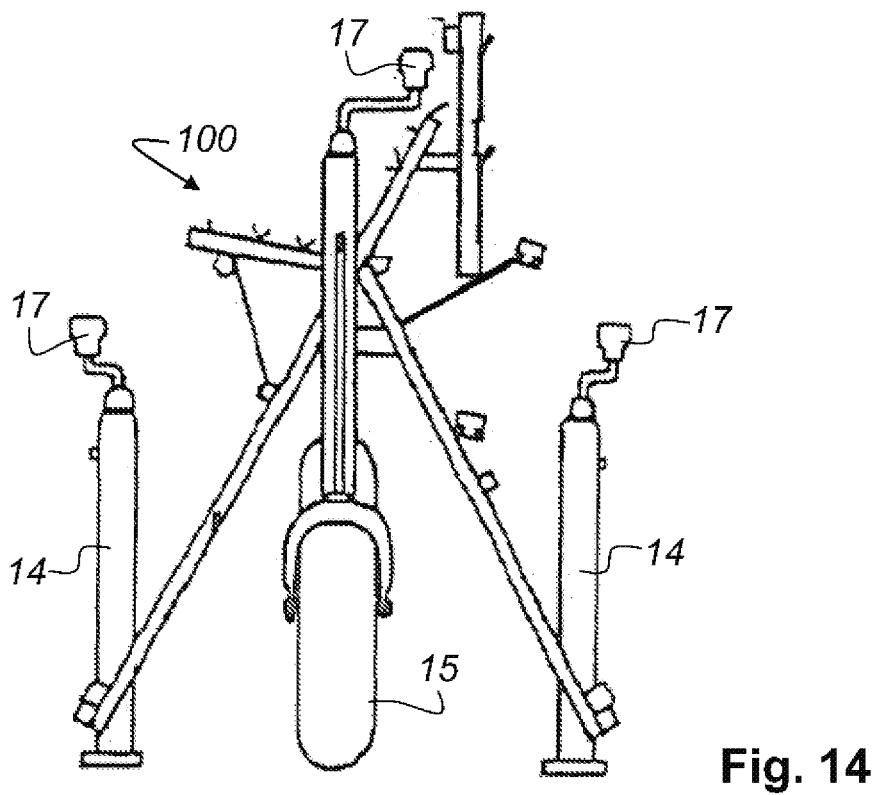
FIG. 14 is a front view of the side of the saw bench, on which the wheel is mounted.

FIG. 10 is a plan view of the embodiment of saw bench 100 shown in FIG. 7. Plurality of extension modules 30 are releasable connected to saw bench 100 in order to extend length of the saw bench 100.

FIGS. 11-14 show another embodiment of saw bench 100. The structure of saw bench 100 is identical to the structure of saw bench 100 described in FIG. 1. However, carrying wheel 15 is provided for easier transport. Wheel 15 is mechanically adjustable in height by means of crank 17. Likewise, driving handles 18 are provided, with which saw bench 100 can be moved by user to another location. The driving handles 18 and wheel 15 are pluggable or connectable with frame 8. Frame 8 has take-up device 8A, and driving handles 18 and wheel 15 lock together. Four height-adjustable floor supports 14 are connected to frame 8. Adjustments of floor supports 14 are made via crank 17.

Figure 15:
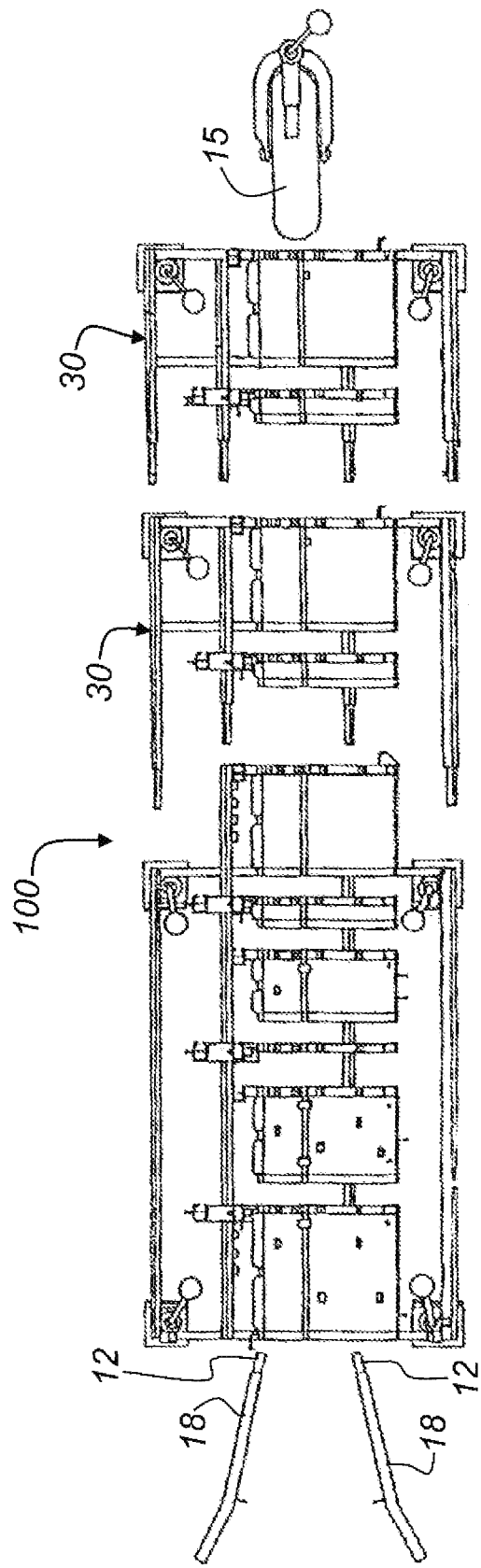
FIG. 15 is a plan view of a further embodiment of the mobile saw bench, with two extension modules provided for the extension of the saw bench.

FIG. 15 is a top view of a further embodiment of saw bench 100. Saw bench 100 is similar in construction to saw bench 100 as shown in FIG. 8. In order to extend length of saw bench 100, two extension modules 30 are provided. The manner of connection of extension modules 30 with saw bench 100 has already been described in the foregoing description. Drive handles 18 are releasably connected to saw bench 100. Each driving handle 18 is attached to connector 12. Wheel 15 is connected to the last extension module 30 in chain of extension modules 30.

Figure 16:
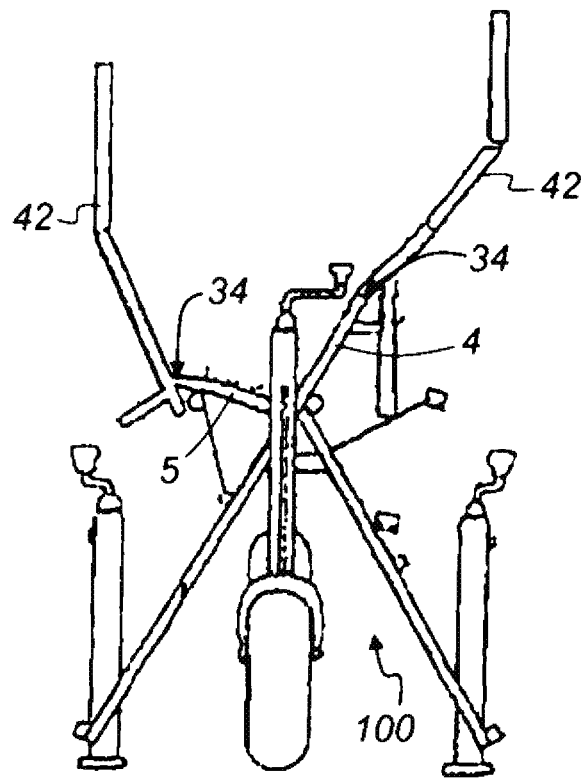
FIG. 16 is a front view of the saw bench according to the invention, with support elements for securing and fixing of the material to be cut.
Figure 17:
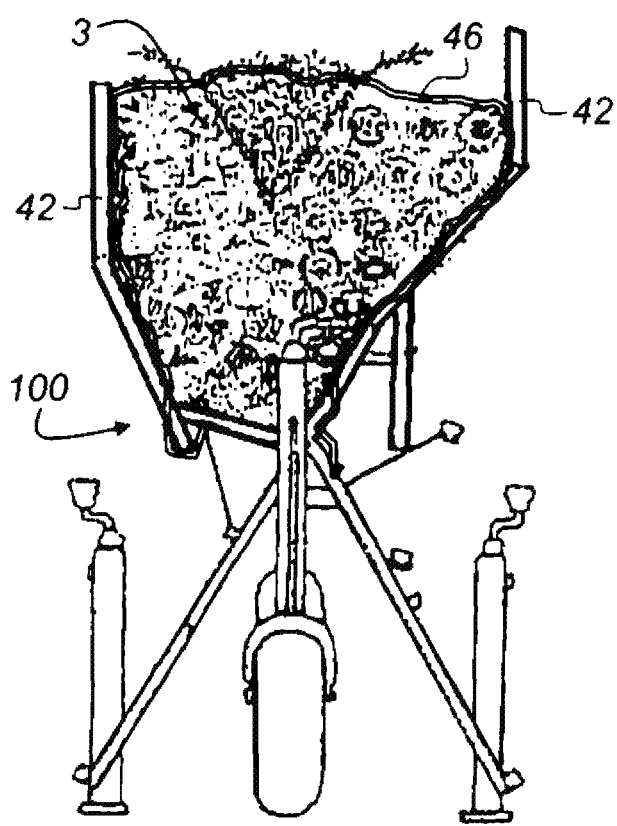
FIG. 17 shows a front view of the saw bench from FIG. 16 with material to be cut supported by the saw bench.

FIG. 16 and FIG. 17 show front views of saw bench 100, wherein holding elements 42 are mounted in order to increase amount or volume of material to be cut 3 resting on saw bench 100. Holding elements 42 allow safeguard and fixation of the material to be cut. At least one holding element 42 mounted with a free end 34 of first abutting element 4 and at least one other holding element 42 connected to free end 36 of second abutting element 5. At least one take-up device 37 is provided with which holding elements 42 cooperate in a form-fitting manner. For better fixation of material to be cut 3 on saw bench 100, at least one elastic element 46 is provided which can be stretched over stack of material to be cut 3.

Figure 18:
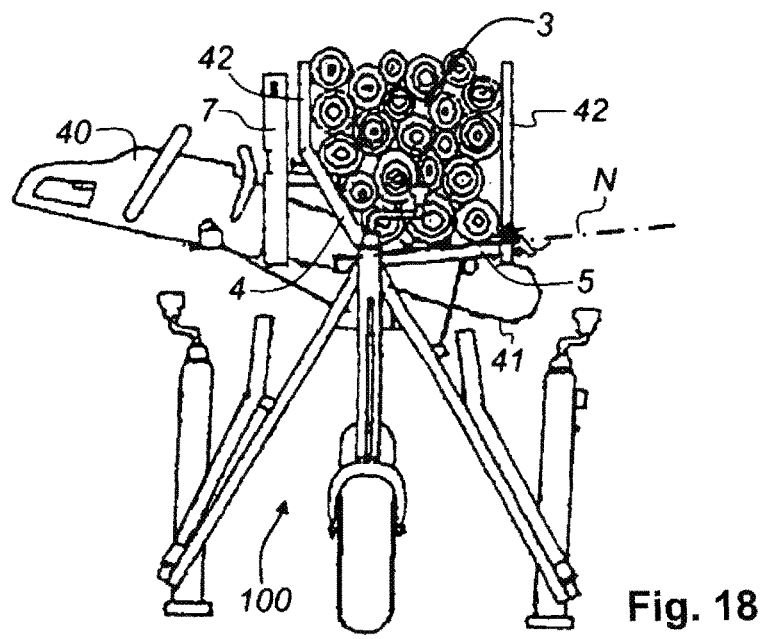
FIG. 18 shows a front view of the saw bench, wherein the material to be cut are round logs.
Figure 19:
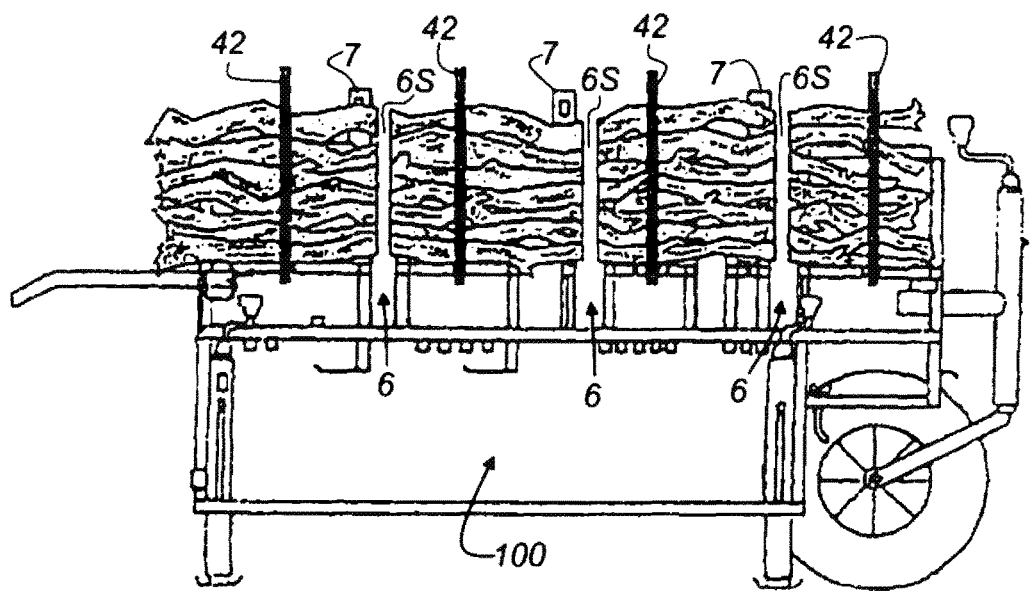
FIG. 19 is a side view of the saw bench shown in FIG. 18, wherein the round timber stack is cut at several places.

FIG. 18 is a front view of saw bench 100 with piled material to be cut 3. The piled material to be cut 3 is of round wood. Different holding elements 42 are assigned to first abutting element 4 and to second abutting element 5. Sawing member 40, which is guided in guide rail 7, is a chain saw for cutting stack of logs. After cutting, at least a portion of the blade of chain saw 41 is below level N of the second abutting element 5. A side view of illustration FIG. 18 is shown in FIG. 19. It can be seen that the stack of round wood is cut at several places. A plurality of holding elements 42 serve to fix the woodpile at several places. The places 6S of cut wood are located at kerfs 6 and next to guide rail 7 for sawing member 40. Thus, the cut wood pile remains after cutting on saw bench 100.

Figure 20:
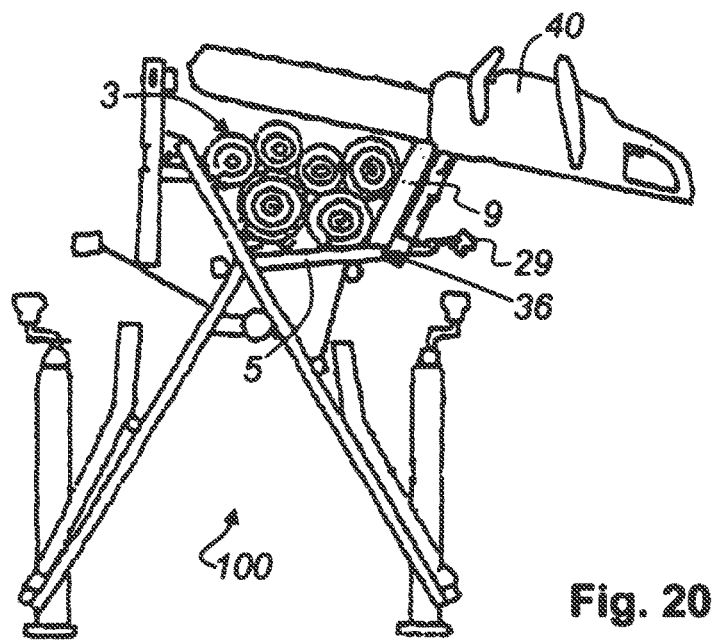
FIG. 20 illustrates a further possibility of attaching the saw member.
Figure 21:
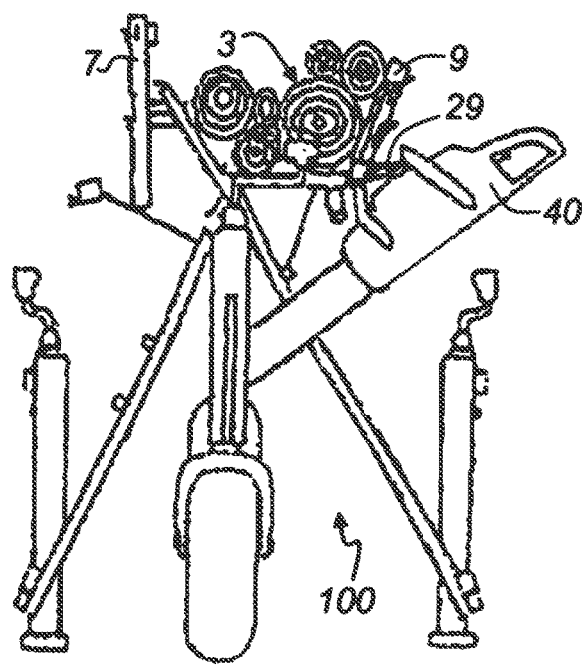
FIG. 21 illustrates a position of the saw member after cutting the round timber stack.

FIG. 20 shows another embodiment of saw bench 100, wherein sawing member 40 is attached to saw bench 100. Sawing member 40 is guided in a second guide rail 9, which can be mounted to frame 8 into take-up device 33 at free end 36 of second abutting element 5 and can be secured in place. FIG. 21 shows the situation after the cutting process with sawing member 40. Guide pin 26 (not shown) is connected to sawing member 40, in order to slidably guide sawing member 40 in second guide rail 9. Second guide rail 9 has holding fork 29 for parking sawing member 40 after cutting through the timber stack.

Figure 22:
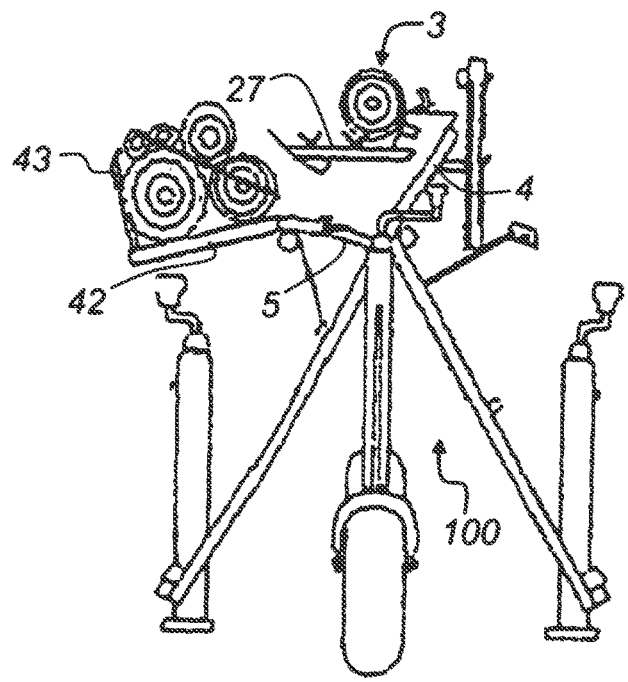
FIG. 22 illustrates an attachment of an additional saw bench to the saw bench.

In FIG. 22, additional saw bench 27 is shown on saw bench 100. Additional saw bench 27 is connected to first abutting element 4. Material to be cut 3 is already on additional saw bench 27. The second abutting element 5 has a holding element 42. Holding element 42 has stop 43 so that several pieces of wood can be parked within holding element 42.

Figure 23:
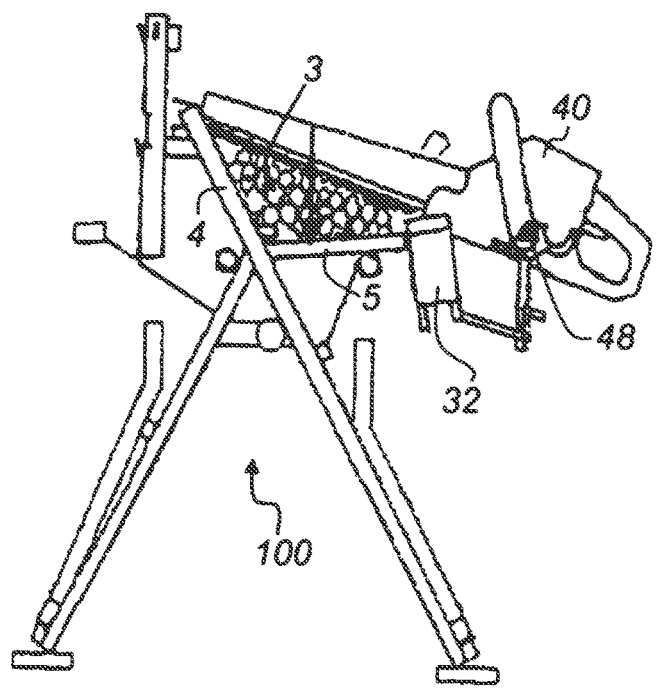
FIG. 23 illustrates a rocking device for a saw member that can be attached to the saw bench.

FIG. 23 shows rocking device 32 for sawing member 40. Rocking device 32 is mounted to second abutting element 5 of saw bench 100. Material to be cut 3 rests against first abutting element 4 and second abutting element 5. Rocking device 32 and securing pin 48 ensure safe cutting for motor, hydraulic or pneumatic driven sawing members 40. After cutting, material to be cut 3 remains on saw bench 100.

Figure 24:
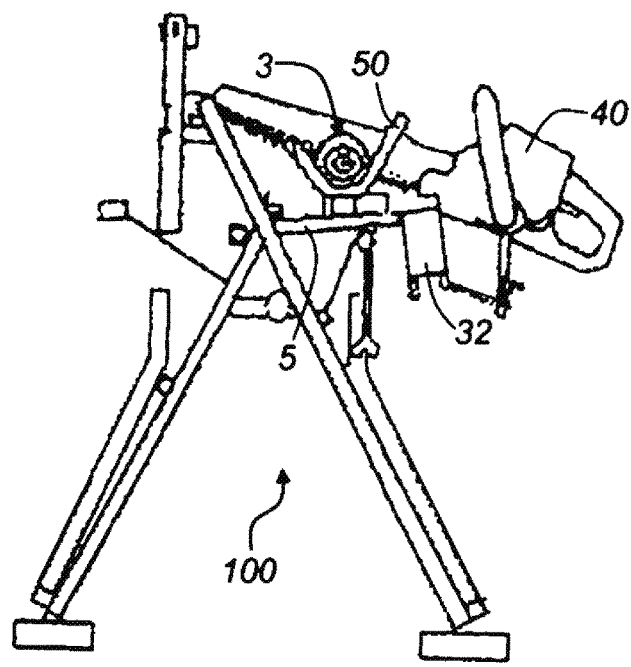
FIG. 24 illustrates a further timber holding fork which is mountable on the saw bench.

FIG. 24 shows additional timber holding fork 50, which is mountable on saw bench 100. Rocking device 32 for sawing member 40 is mounted onto second abutting element 5. Timber holding fork 50 secures material to be cut 3. Rocking device 32 guides sawing member 40.

Figure 25:
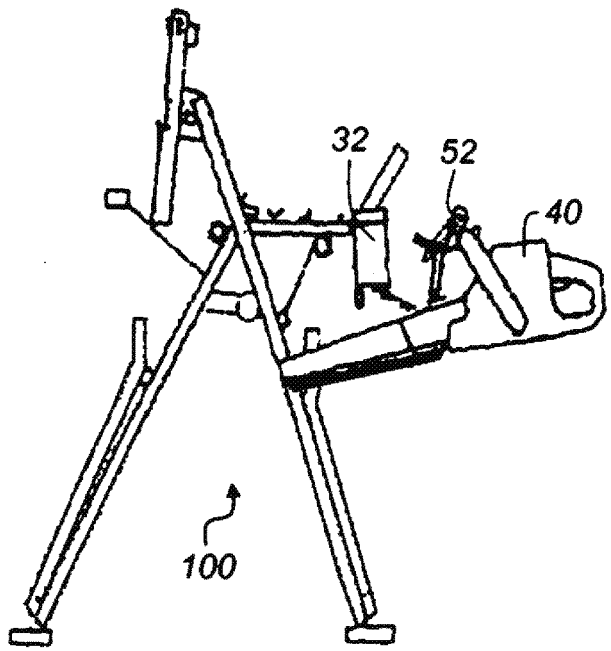
FIG. 25 illustrates the rocking device on the saw bench, and the sawing member in the park position.

FIG. 25 shows sawing member 40 in park position 52 of rocking device 32.

Park position 52 allows easy removal of sawing member 40 for further sawing. Sawing member 40 is parked directly on saw bench 100.

Figure 26:
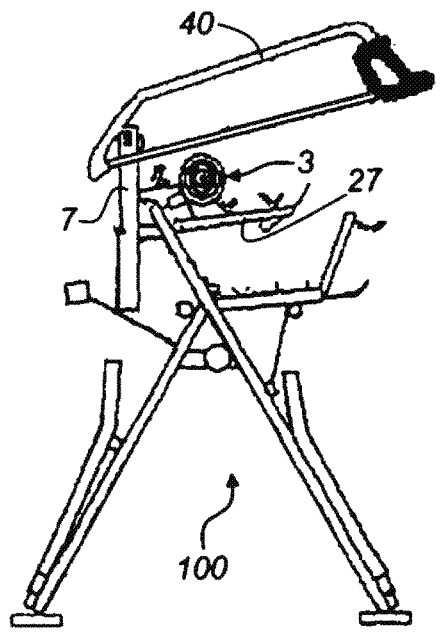
FIG. 26 illustrates a hand saw, which is guided by a first guiding rail for the saw bench.

FIG. 26 shows an embodiment wherein sawing member 40 is a hand saw. The hand saw is guided in first guide rail 7 of saw bench 100. Here, the material to be cut 3 is on additional saw bench 27.

Figure 27:
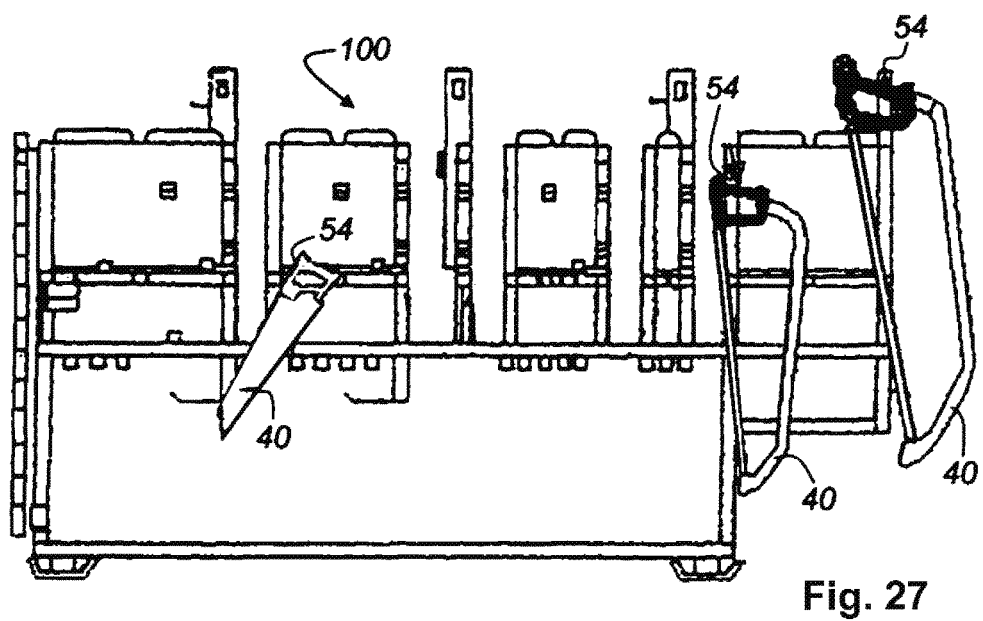
FIG. 27 is a side view of the saw bench, where at different mounting brackets sawing members are parked.

FIG. 27 is a side view of another embodiment of saw bench 100. Saw bench 100 has different retaining brackets 54 for parking various sawing members 40 for sawing by hand. Parked sawing members 40 do not disrupt workflow.

Figure 28:
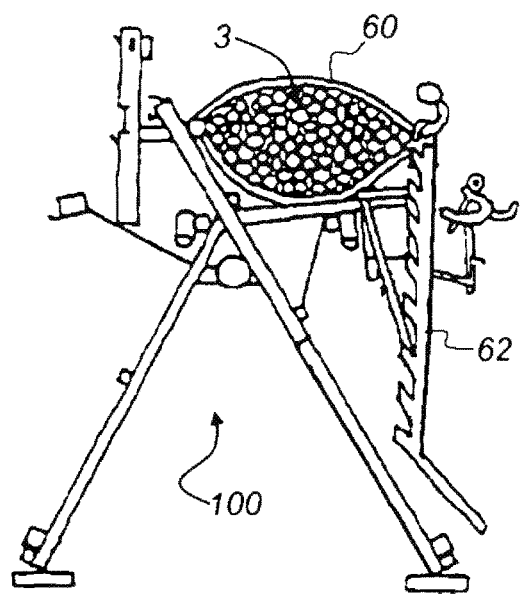
FIG. 28 is a view of brushwood mounted on the saw bench.

FIG. 28 shows press 60 mounted on saw bench 100. Locking clamp 62 ensures that material to be cut 3 (twigs) are secured together.

Figure 29:
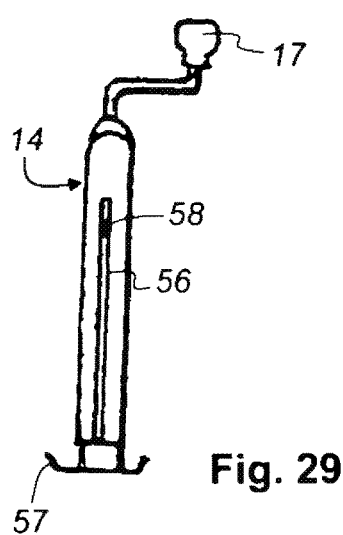
FIG. 29 illustrates a height-adjustable floor support.

FIG. 29 is an enlarged view of height adjustable floor support 14. This embodiment of adjustable floor support 14 has longitudinal slot 56, in which pin 58 is slidably guided.

Figure 30:
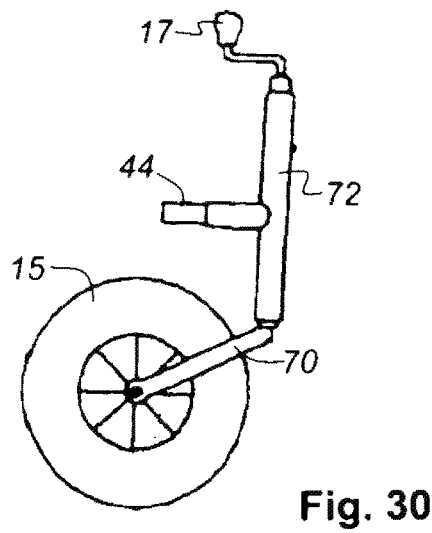
FIG. 30 illustrates a transport wheel for the saw bench, which is also adjustable in height.

Crank 17 adjusts the height of floor support 14. The sliding motion of pin 58 in longitudinal slot 56 prevents rotation of base 57, which is at end of floor support 14, opposing crank 17. Similarly, wheel 15 (shown in FIG. 30), can be adjusted in height. Wheel 15 is mounted via a fork 70 on a bearer 72, and the height of wheel 15 may be adjusted via crank 17. Pin 44 is mounted on bearer 72 into which wheel 15 is inserted.

Figure 31:
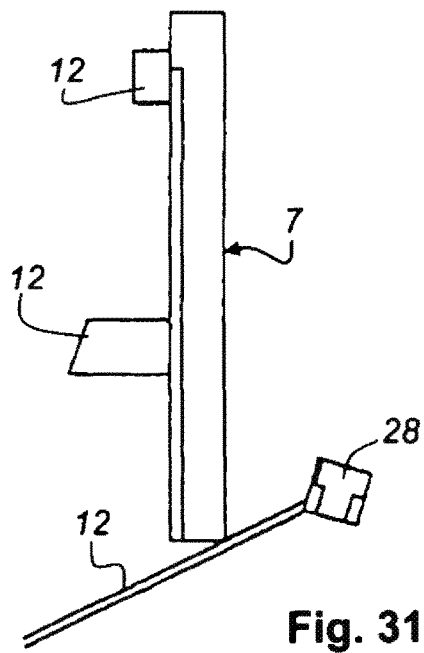
FIG. 31 is a side view of a first guide rail.
Figure 32:
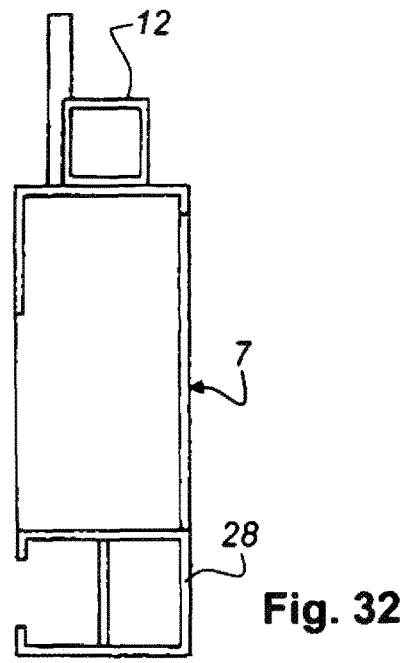
FIG. 32 is a plan view of the first guide rail.

FIG. 31 and FIG. 32 show different views of first guide rail 7. First guide rail 7 can be mounted in different ways, so it can be connected with saw bench 100. First guide rail 7 has connectors 12 through which attachment to saw bench 100 is defined. Holding fork 28 is used for parking various sawing members 40.

Figure 33:
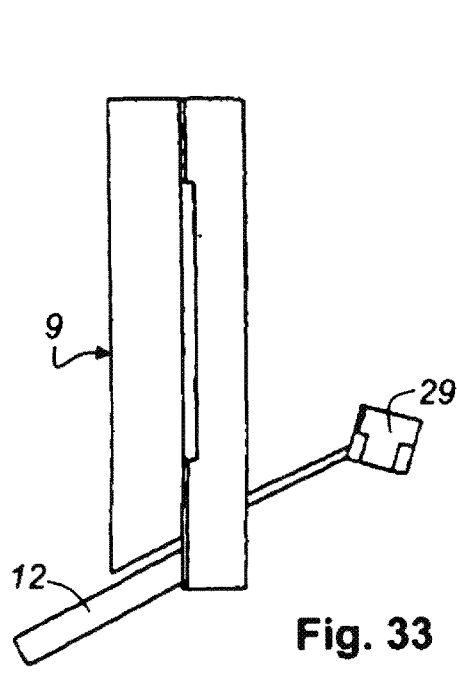
FIG. 33 is a side view of a second guide rail.
Figure 34:
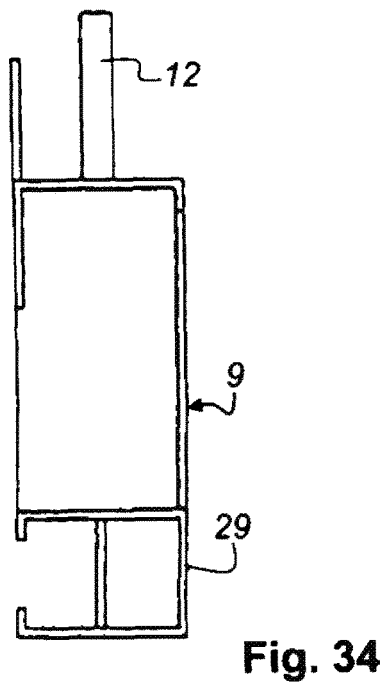
FIG. 34 is a plan view of the second guide rail.

FIG. 33 and FIG. 34 show various views of second guide rail 9. Second guide rail 9 can be mounted in different ways, so that it can be connected with saw bench 100. The second guide rail 9 has connectors 12 through which the attachment to second abutting element 5 of saw bench 100 is achieved. Holding fork 29 is used for parking of various sawing members 40.

Figure 35:
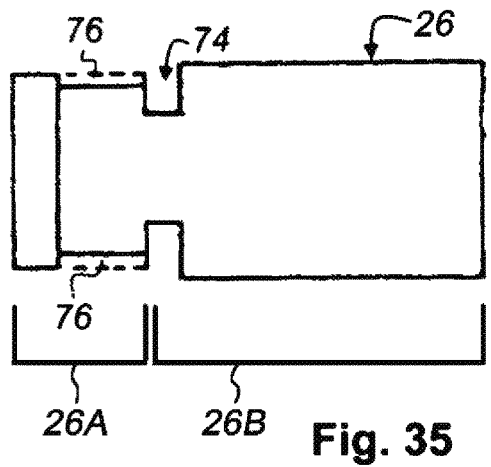
FIG. 35 is a side view of the guide pin.
Figure 36:
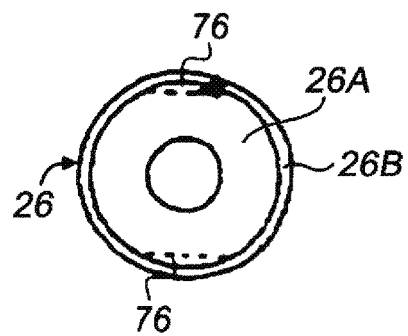
FIG. 36 is a front view of the guide pin.

FIG. 35 and FIG. 36 show different views of guide pin 26. Guide pin 26 is used with motor, hydraulically or pneumatically driven sawing members 40. Guide pin 26 is adapted for sliding movement in first guide rail 7 or second guide rail 9. Therefore, guide pin 26 comprises first end 26A, second end 26B, and radial and circumferential groove 74 formed to ensure secure movement in first guide rail 7 or second guide rail 9. Specifically, first end 26A slidingly engages channel 7A of guide rail 7, as is discussed in greater detail below. Guide pin 26 further comprises take-up 76 for a wrench, so that guide pin 26, which is fixed to sawing member 40 and can be removed from sawing member 40.

Figure 37:
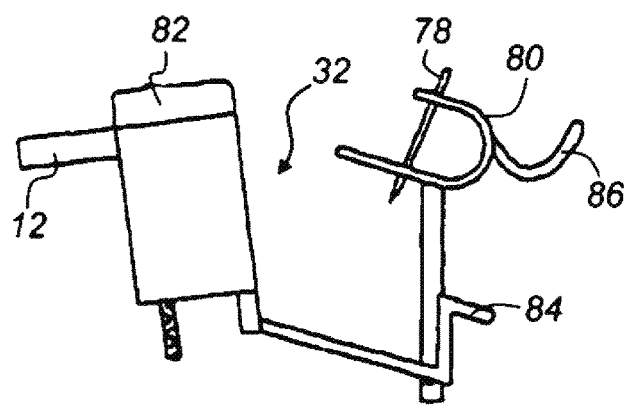
FIG. 37 is a side view of the rocking device.

FIG. 37 shows a side view of pluggable rocking device 32. Rocking device 32 has rocking holder 80 for anchored motor, hydraulic or pneumatic driven sawing members 40. Securing of sawing members 40 in rocking holder 80 is carried during sawing process with safety pin 78. The guide channel 82 of rocking device 32 ensures no dodging motor, hydraulic or pneumatic driven sawing members 40. Stop 84 limits sawing. Sawing members 40, which are hydraulically or pneumatically operated, can be parked in bracket holder 86 after the sawing process is finished. Connectors 12 mount rocking device 32 to saw bench 100.

Figure 38:
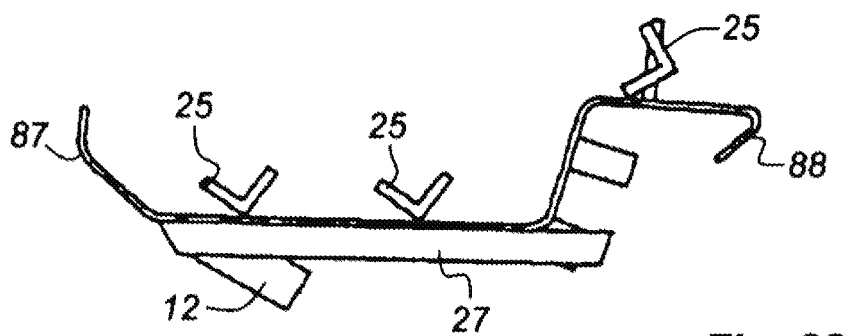
FIG. 38 is a side view of a mountable additional saw bench.

FIG. 38 is side view of additional saw bench 27. Material to be cut 3 is placed on the side of additional saw bench 27, and securing elements 25 are provided. Securing elements 25 prevent the slipping of material to be cut 3. Connectors 12 are received in corresponding mount 23 of frame 8 of saw bench 100, so that additional saw bench 27 is securely mounted on saw bench 100. Furthermore, additional saw bench 27 carries handle 87 and suspension bracket 88.

Figure 39:
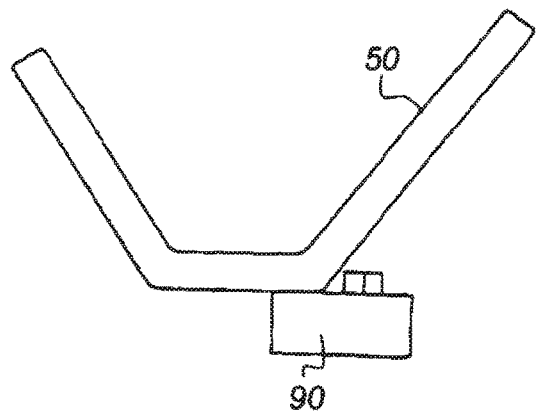
FIG. 39 is a side view of the timber holding fork.

FIG. 39 is a side view of timber holding fork 50, which is bolted on saw bench 100 with support tube 90. Material to be cut 3 is safely secured during sawing process in timber holding fork 50.

Figure 40:
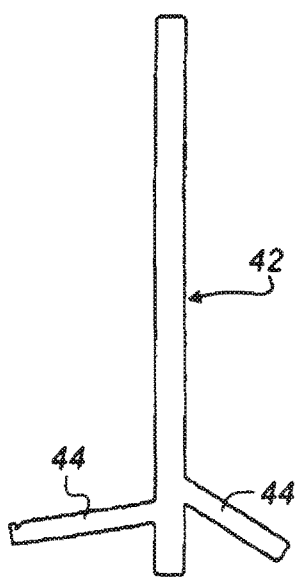
FIG. 40 is a side view of an embodiment of a holding element for material to be cut.
Figure 41:
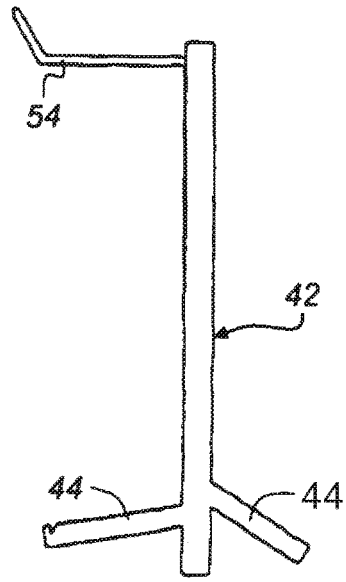
FIG. 41 is a side view of another embodiment of a mountable holding element for material to be cut.

FIG. 40 and FIG. 41 show examples of different embodiments of mountable holding elements 42. Holding elements 42 shown here represent selection and should not be considered as limitations of the invention. Holding elements 42 can have various configurations. Each holding element 42 has at least one pin 44, which cooperates with corresponding take-up device 37 on saw bench 100. Holding element 42, shown in FIG. 41, carries retaining bracket 54 for mechanical saws.

FIG. 42A shows guide rail 7, namely, detail A of FIG. 2. Guide rail 7 includes channel 7A and opening 7B. FIG. 42B shows detail A as shown in FIG. 42A, but with guide pin 26 engaged in guide rail 7. As shown, first end 26A is removably engaged in channel 7A. Second end 26B extends through opening 7B and outside of guide rail 7.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS 2 cross member
3 material to be cut
4 first abutting element
5 second abutting element
6 kerf
6S places of the cut
7 first guide rail
7A channel
7B opening
8 frame
8A take-up device
8E free end
9 second guide rail
10 first pair of legs
11 legs
12 connector
13 floor supports
14 floor supports
15 carrying wheel
17 crank
18 driving handles
19 parking position
20 second pair of legs
21 legs
23 mount
24 support surface
25 securing elements
26 guide pin
26A first end
26B second end
27 additional saw bench
28 holding fork
29 holding fork
30 extension module
32 rocking device
33 take-up device
36 free end
37 take-up device
40 sawing member
41 chain saw
42 holding elements
43 stop
44 pin
46 elastic element
48 securing pin
50 timber holding fork
54 retaining brackets
56 longitudinal slot
57 base
58 pin
60 press
62 locking clamp
70 fork 72 bearer
74 groove
76 take-up
78 safety pin
80 rocking holder
82 guide channel
84 stop
86 bracket holder
87 handle
88 suspension bracket
90 support tube
100 saw bench
α angle
β angle
N level
A detail

What is claimed is:

1. A saw bench comprising:
   a first pair of legs;
   a second pair of legs;
   at least two cross members for material to be cut are arranged between the first pair of legs and the second pair of legs;
   a first abutting element and a second abutting element are arranged on each cross member and are arranged at an angle with respect to each other;
   a kerf is defined between the cross members;
   at least a first guide rail connected to the first abutting element, the first guide rail including a first planar surface and a second planar surface perpendicularly connected to the first planar surface; and,
   a guide pin slidably guided along the first and second planar surfaces, the guide pin including:
      a first end removably engaged with the at least the first guide rail; and,
      a second end operatively arranged to be secured to a sawing member.

2. The saw bench recited in claim 1, wherein said legs of the first pair of legs and said legs of the second pair of legs are mounted such that the legs of each pair of legs are arranged at an acute angle.

3. The saw bench recited in claim 1, wherein four rigid floor supports are rigidly mounted to the legs.

4. The saw bench recited in claim 1, wherein four height-adjustable floor supports are connected to the frame.

5. The saw bench recited in claim 1, wherein at least one extension module is releasably connectable to the frame of the saw bench.

6. The saw bench recited in claim 5, wherein the extension module is provided with two rigid floor supports or two height-adjustable floor supports.

7. The saw bench recited in claim 1, wherein a carrying wheel is attachable to the saw bench, and the carrying wheel is mechanically adjustable in height via a crank.

8. The saw bench recited in claim 1, wherein two driving handles are mountable in corresponding receptacles on the frame in both driving directions.

9. The saw bench recited in claim 8, further comprising a plurality of parking positions located on the legs, wherein each driving handle can be inserted into the corresponding parking position.

10. The saw bench recited in claim 1, wherein the first abutting element and the second abutting element each comprise one or more securing elements on a support surface for the material to be cut in order to prevent slipping of the material to be cut.

11. The saw bench recited in claim 1, wherein the first guide rail is mounted to the frame from the rear of the first abutting element, a guide pin, provided with a sawing member, is slidably guided in the first guide rail and a holding fork is mounted to the first guide rail in order to park the sawing member.

12. The saw bench recited in claim 1, wherein the second guide rail is mounted to the frame through a receptacle provided at a free end of the second abutting element,
   a guide pin, is provided with the sawing member, is slidably guided in the second guide rail, and a holding fork is mounted to the second guide rail in order to park the sawing member.

13. The saw bench recited in claim 1, wherein a rocking device is mounted to the frame by a receptacle at a free end of the second abutting element, a guide pin, provided with the sawing member, is slidably guided in a guide channel and a holding fork provided on the rocking device in order to park the sawing member.

14. The saw bench recited in claim 1, wherein at a free end of the first abutting element and/or at a free end of the second abutting element each have at least one take-up device in which holding elements for wood are pluggable.

15. The saw bench recited in claim 14, wherein each holding element has at least one pin which engages in a form-fitting manner with the take-up device for attaching the holding element.

16. A saw bench comprising:
   a first pair of legs;
   a second pair of legs;
   at least two cross members for material to be cut are arranged between the first pair of legs and the second pair of legs;
   a first abutting element and a second abutting element are provided with each cross member and being arranged at an angle with respect to each other;
   a kerf is defined between the cross members;
   at least a first guide rail for a sawing member is mounted on the saw bench in such a way that, during sawing of the material to be cut, the sawing member reaches through the kerf below a level of the material to be cut, wherein the first guide rail is mounted to the frame from the rear of the first abutting element, and wherein the first guide rail includes a first planar surface and a second planar surface perpendicularly connected to the first planar surface;
   a guide pin, provided with a sawing member, slidably guided along the first and second planar surfaces, the guide pin including a first end removably engaged with the at least first guide rail, and a second end operatively arranged to be secured to a sawing member; and,
   a holding fork is mounted to the first guide rail in order to park the sawing member.

17. A saw bench comprising:
   a first pair of legs;
   a second pair of legs;
   at least two cross members for material to be cut are arranged between the first pair of legs and the second pair of legs;
   a first abutting element and a second abutting element are arranged on each cross member and are arranged at an angle with respect to each other;
   a kerf is defined between the cross members;
   a first guide rail connected to the first abutting element, the first guide rail including a first planar surface and a second planar surface perpendicularly connected to the first planar surface;

a first guide pin slidably guided along the first and second planar surfaces, the first guide pin including:
   a first end removably arranged in the first guide rail; and,
   a second end extending from the first guide rail and operatively arranged to be secured to a sawing member.

18. The saw bench as recited in claim 17, further comprising:
   a second guide rail connected to the second abutting element;
   a second guide pin slidingly and removably connected to the second guide rail, the second guide pin including:
      a third end removably arranged in the second guide rail; and,
      a fourth end extending from the second guide rail and operatively arranged to be secured to the sawing member.

\* \* \* \* \*